US008351798B2

(12) United States Patent
Edirisinghe et al.

(10) Patent No.: US 8,351,798 B2
(45) Date of Patent: Jan. 8, 2013

(54) PHASE SHIFT KEYED HIGH SPEED SIGNALING

(75) Inventors: Sumudu Geethika Edirisinghe, Gravesend (GB); Jörg Erich Schwartz, Loughton (GB); Wai Mun Wong, Birmingham (GB)

(73) Assignee: Xtera Communications Ltd., Harold Wood (GB)

( * ) Notice: Subject to any disclaimer, the term of this patent is extended or adjusted under 35 U.S.C. 154(b) by 1004 days.

(21) Appl. No.: 12/252,962

(22) Filed: Oct. 16, 2008

(65) Prior Publication Data

US 2009/0123153 A1  May 14, 2009

(30) Foreign Application Priority Data

Oct. 16, 2007 (GB) .................................. 0720227.8
Apr. 15, 2008 (GB) .................................. 0806826.4

(51) Int. Cl.
H04B 10/04 (2006.01)
H04B 10/12 (2006.01)
(52) U.S. Cl. ...................................................... 398/193
(58) Field of Classification Search .................. 398/193
See application file for complete search history.

(56) References Cited

U.S. PATENT DOCUMENTS

| 5,047,820 | A | 9/1991 | Garnett |
| 5,877,879 | A | 3/1999 | Naito |
| 6,324,317 | B1* | 11/2001 | Tanaka et al. ................... 385/24 |
| 2001/0019278 | A1 | 9/2001 | Sudo et al. |
| 2002/0130646 | A1 | 9/2002 | Zadeh et al. |
| 2002/0131711 | A1* | 9/2002 | Tanaka et al. ................... 385/39 |
| 2003/0007216 | A1 | 1/2003 | Chraplyvy et al. |
| 2004/0028319 | A1 | 2/2004 | Ajgaonkar et al. |
| 2006/0045533 | A1 | 3/2006 | Pilipetskii et al. |
| 2007/0183711 | A1* | 8/2007 | Abbott et al. ................... 385/24 |

FOREIGN PATENT DOCUMENTS

| EP | 0295391 A1 | 12/1988 |
| EP | 1406400 A2 | 4/2004 |

OTHER PUBLICATIONS

Cai J-X et al: "Experimental comparison of the RZ-DPSK and NRZ-DPSK modulation formats" Optical Fiber Communication Conference, 2005. Technical Digest. OFC/NF OEC Anaheim, CA, USA March 6-11, 2005, Piscataway, NJ, USA,IEEE, vol. 4, Mar. 6, 2005, pp. 367-369, XP010831926 ISBN: 978-1-55752-783-7.

(Continued)

Primary Examiner — Danny Leung
(74) Attorney, Agent, or Firm — Workman Nydegger

(57) ABSTRACT

Fiber optic transmission technologies that allow DPSK or even higher order PSK to be performed at 20 gigabits per second per channel or even higher bit rates in a WDM (e.g., DWDM) wavelength multiplexed channeling environment. The technology employs pre-compensation of chromatic error dispersion such for each of most, if not all, channels have a portion of minimum absolute accumulated dispersion that occurs somewhere within the length (perhaps at the midpoint) of the optical channel. Post-compensation is then employed at the receiver to reduce or even potentially eliminate the chromatic dispersion. The technology allows for reduced bit error rates at high bit rates over even very long haul (e.g., trans-oceanic submarine or long terrestrial) optical fiber links, and for all channels.

20 Claims, 14 Drawing Sheets

OTHER PUBLICATIONS

Gregory Raybon et al: "1-Tb/s (10107 Gb/s) Electronically Multiplexed Optical Signal Generation and WDM Transmission" Journal. of Lightwave Technology, IEEE Service Center; New York, NY, US, vol. 25, No. 1, Jan. 1, 2007, pp. 233-238, XP011175490 ISSN: 0733-8724.

Naito T et al: "Four 5-gbit/s WDM transmission over 4760-km straight-line using pre- and post-dispersion compensation and FWM cross talk reduction" Optical Fiber Communications, 1996. OFC '96 Feb. 25-Mar. 1, 1996, Piscataway; NJ, USA,IEEE, Feb. 25, 1996, pp. 182-183, XP010539914 ISBN: 978-1-55752-422-5.

Choi B.H. et al: "Dispersion map optimisation and dispersion slope mismatch effects for 40 channelx10 Gbit/s transmission over 3000 km using standard SMF and EDFA amplification" Optics Communications, North-Holland Publishing Co. Amsterdam, NL, vol. 242, Dec. 8, 2004, pp. 525-532, XP004671469 ISSN: 0030-4018.

PCT/GB2008/003506, Notification of Transmittal of the International Search Report and the Written Opinion of the International Searching Authority, or Declaration dated Apr. 20, 2010. (7 pages).

L Molle, C. Caspar, R. Freund, S. Desbruslais, R. Oberland, J. Schwartz, "Upgrades of Non-Slope Matched Submarine Transmission Systems Using Differential Phase Shift Keying" in Proc. OFC/NFOEC 2007, Anaheim, CA, Paper OWM2. (3 pages).

E. Golovchenko, L.Rahman, B. Bakhshi, D. Kovsh, F. Idrovo, S. Abbott, "Field Deployment of WDM 10 Gb/s Capacity over 10,757 km of Reconfigured Portion of SAm-1 Cable System" in Proc. OFC/NFOEC 2007, Anaheim, CA, Paper PDP27 (3 pages).

S. Dupont, P. Marmier, L. du Mouza, G. Charlet, V. Letellier, "70×10 Gbps (mixed RZ-OOK and RZ-DPSK) upgrade of a 7224 km conventional 32×10 Gbps designed system", in Proc. ECOC 2007, Berlin, Germany, Paper 2.3.5 (2 pages).

D.G. Foursa, "DPSK Performance in Field and Laboratory Experiments" in Proc. OFC/NFOEC 2005, Anaheim, CA, Paper OthC3 (3 pages).

P. Plantady, L. du Mouza, S. Dupont, P. Marmier, C. Lange, P. Bollaert, M. Jaouen, G. Vareille, V. Letellier, "DPSK Transmission Exeriments over DSMF and NZDSF" in Proc. Suboptic 2007, Baltimore, MD, Paper thB1.7.

A. Pilipetskii, M. Nissov, N.S. Bergano, "The RZ-DPSK Modulation Format in Long-Haul Transmission Systems" in Proc. Suboptic 2007, Baltimore, MD, Paper ThB1.6 (4 pages).

H. Kim, "Cross-Phase-Modulation-Induced Nonlinear Phase Noise in WDM Direct-Detection DPSK Systems", J. Lightwave Technol., vol. 21, pp. 1770-1774, Aug. 2003. (5 pages).

G. Charlet et al, Proc. IEEE vol. 94 (2006), p. 935 Upgrading WDM Submarine Systems to 40-Gbit/s Channel Bitrate (17 pages).

M. Nissov et al Proc. LEOS Summer Topicals 2007, paper ME3.1 s.

L. Molle et al, Proc OFC 2007, Paper OWM2 High Data Rate Submarine Transmission Systems: Getting to and beyond 40 Gb/s (2 pages).

D.Z. Chen et al. Proc OFC 2006, paper PDP30 "New Field Trial Distance Record of 3040 km on Wide Reach WDM with 10 and 40 Gbps Transmission Including OC-768 Traffic Without Regeneration" (4 pages).

* cited by examiner

PHASE SHIFT KEYED HIGH SPEED SIGNALING

CROSS-REFERENCE TO RELATED APPLICATIONS

The present application claims priority under 35 U.S.C. 119(a) to United Kingdom (UK) patent application number 0720227.8 filed Oct. 16, 2007, which UK patent application is incorporated herein by reference in its entirety. The present application also claims priority under 35 U.S.C. 119(a) to United Kingdom (UK) patent application number 0806826.4 filed Apr. 15, 2008, which UK patent application is also incorporated herein by reference in its entirety.

BACKGROUND

Fiber-optic communication networks serve a key demand of the information age by providing high-speed data between network nodes. Fiber optic communication networks include an aggregation of interconnected fiber-optic links. Simply stated, a fiber-optic link involves an optical signal source that emits information in the form of light into an optical fiber. Due to principles of internal reflection, the optical signal propagates through the optical fiber until it is eventually received into an optical signal receiver. If the fiber-optic link is bi-directional, information may be optically communicated in reverse typically using a separate optical fiber.

Fiber-optic networks are used in a wide variety of applications, each requiring different lengths of fiber-optic links. For instance, relatively short fiber-optic links may be used to communicate information between a computer and its proximate peripherals, or between local video source (such as a DVD or DVR) and a television. On the opposite extreme, however, fiber-optic links may extend thousands of kilometers when the information is to be communicated across the globe. For instance, a submarine fiber-optic link may rest on an ocean floor spanning entire oceans to thereby connect two remote continents.

Transmission of optic signals over such long distances presents enormous technical challenges. Significant time and resources may be required for any improvement in the art of submarine and other long-haul optical communication. Each improvement can represent a significant advance since such improvements often lead to the more widespread availability of communication throughout the globe. Thus, such advances may potentially accelerate humankind's ability to collaborate, learn, do business, and the like, regardless of where an individual resides on the globe.

Conventionally, installed submarine systems are designed to employ Dense Wavelength Division Multiplexing (DWDM) in which information is communicated over N channels (where N is an integer that is often 16 or more), each channel corresponding to a particular wavelength. Conventional installed submarine fiber-optic links include N channels of 2.5 gigabits per second (Gbit/s) or N channels of 10 Gbit/s data, and use Amplitude Shift Keying (ASK) (also called On-Off-Keying (OOK)) modulation. At 10 Gbit/s, such channels might be separated by, for example, 100 gigahertz (GHz), 50 GHz, or even smaller provided that inter-channel interference does not begin to degrade the signal.

Submarine fiber-optic links use single-mode fiber in which the primary dispersion mechanism is called "chromatic dispersion" (often also called "material dispersion"). This chromatic dispersion occurs because optics of different wavelengths tend to travel through the optical fiber at slightly different speeds. Without adequate compensation, this can result in the distortion and eventual loss of the signal over the long length of the optical fiber.

Some optical fibers are "positive dispersion" fiber in which the longer wavelength (lower frequency) light travels through the fiber slightly slower than the shorter wavelength (higher frequency) light. Other optical fibers are "negative dispersion" fiber in which the longer wavelength (lower frequency) light travels through the fiber slightly faster than the shorter wavelength (higher frequency) light. By mixing the use of negative dispersion and positive dispersion fibers, the dispersion can often be largely (but often not completely) cancelled out.

Submarine fiber-optic links remain sensitive to this portion of dispersion that is not cancelled out through the mixing of positive and negative dispersion fibers. Accordingly, conventional submarine fiber-optic systems often employ post-compensation of the chromatic dispersion or optimize the post-compensation only even if some pre-compensation is applied to obtain best performance.

Conventional submarine systems widely use a mix of Standard Single Mode Fiber (SSMF) and Non-Zero Dispersion Shifted Fiber (NZDSF), which results in a particular dispersion map as the accumulated dispersion is tracked across the length of the fiber for different wavelength channels.

Differential Phase Shift Keying (DPSK) modulating is a modulation mechanism that has been shown to present an approximate 3 decibel (dB) improved noise performance over ASK. However, the application of DPSK to submarine systems that have this kind of dispersion map is not at all straightforward. For instance, it has been found that the performance of 10 Gbit/s return-to-zero DPSK (RZ-DPSK) is significantly degraded for wavelengths near the accumulated "dispersion zero" region of the NZDSF fiber where the dispersion is regularly well compensated for along the system length. However, at the longer and shorter wavelength channels towards edges of the system gain bandwidth (where the dispersion slope leads to dispersion accumulation along the line and bit-overlapped transmission), the performance of RZ-DPSK showed the expected improvement over ASK.

This degraded performance near the "dispersion zero" region has been attributed to stronger Kerr-effect based interactions which lead to a nonlinear phase noise which increases the bit error rate. It has been shown that not only Self Phase Modulation (SPM) but also cross (X) Phase Modulation (XPM) can lead to such degradation—particularly for low bitrates of 10 Gbit/s and narrow channel spacing (<50 GHz).

One potential solution to this problem is to replace the degraded DPSK central channels by some with Return to Zero ASK (RZ-ASK) modulation, which performs best when there is low accumulated dispersion as in the "zero dispersion" region.

BRIEF SUMMARY

Embodiments described herein relate to fiber optic transmission technologies that allows Differential Phase Shift Keying (DPSK or 2 PSK) or even higher order phase shift keying to be performed at 20 gigabits per second per channel and higher bit rates in a WDM (e.g., DWDM) wavelength multiplexed channeling environment. The technology employs pre-compensation of chromatic dispersion such that each of most, if not all, channels have a minimum absolute accumulated dispersion that occurs somewhere within the length of the optical channel. In one embodiment, for example, the minimum accumulated dispersion occurs halfway along the intended transmission distance. Post-compensation is then employed at the receiver to reduce or even potentially eliminate the chromatic dispersion. The technology allows for reduced bit error rates at high bit rates over even very long haul (e.g., trans-oceanic submarine or long terrestrial) optical fiber links, and for all channels.

The pre-compensation of chromatic dispersion may be performed in an environment in which an optical link is being upgraded. It may be used where a new optical link is being designed and/or installed. For instance, suppose that a new optical link is being installed using dispersion-managed optical fiber sequences. Contrary to conventional dispersion-managed optical fiber links, the dispersion-managed optical fiber link is designed and set up such that the map trend slope of the accumulated chromatic dispersion is intentionally non-horizontal. In order to accomplish this non-horizontal map trend slope, the ratio of positive and negative dispersion fibers (in other words, the "in-line compensation") is adjusted.

In existing systems, where the fiber might more likely not be dispersion-managed, the trend slope of the accumulated chromatic dispersion tends already to be non-horizontal for all but perhaps one wavelength. In either case, the pre-compensation (and post-compensation) of material dispersion may be performed such that a point of minimum accumulated dispersion occurs remotely within the optical fiber link. In one embodiment, the pre-compensation and post-compensation is initially made such that the point of minimum accumulated dispersion occurs at approximately a mid-point or otherwise in a central region of the transmission distance of the optical fiber link. If the pre- and post-compensation are adaptive, this might serve as a starting point for further adaptation of pre-compensation and post-compensation in order to reduce bit error rate.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, fiber optic transmission technologies that allow DPSK or even higher order Phase Shift Keying (PSK) to be performed at 20 gigabits per second per channel or even higher bit rates in a WDM (e.g., DWDM) wavelength multiplexed channeling environment. The technology employs pre-compensation of chromatic dispersion such that each of most, if not all, of the channels have a portion of minimum absolute accumulated dispersion that occurs somewhere within the length (perhaps at the approximate mid-point) of the optical channel. Post-compensation is then employed at the receiver to reduce or even potentially eliminate the chromatic dispersion. The technology allows for reduced bit error rates at high bit rates over even very long haul (e.g., trans-oceanic submarine or long terrestrial) optical fiber links, and for all channels. The pre-compensation of material dispersion may be performed such that a point of minimum accumulated dispersion occurs remotely within the optical fiber link. If the pre-compensation is adaptive, this might serve as a starting point for further adaptation of pre-compensation in order to reduce bit error rate.

Figure 1:
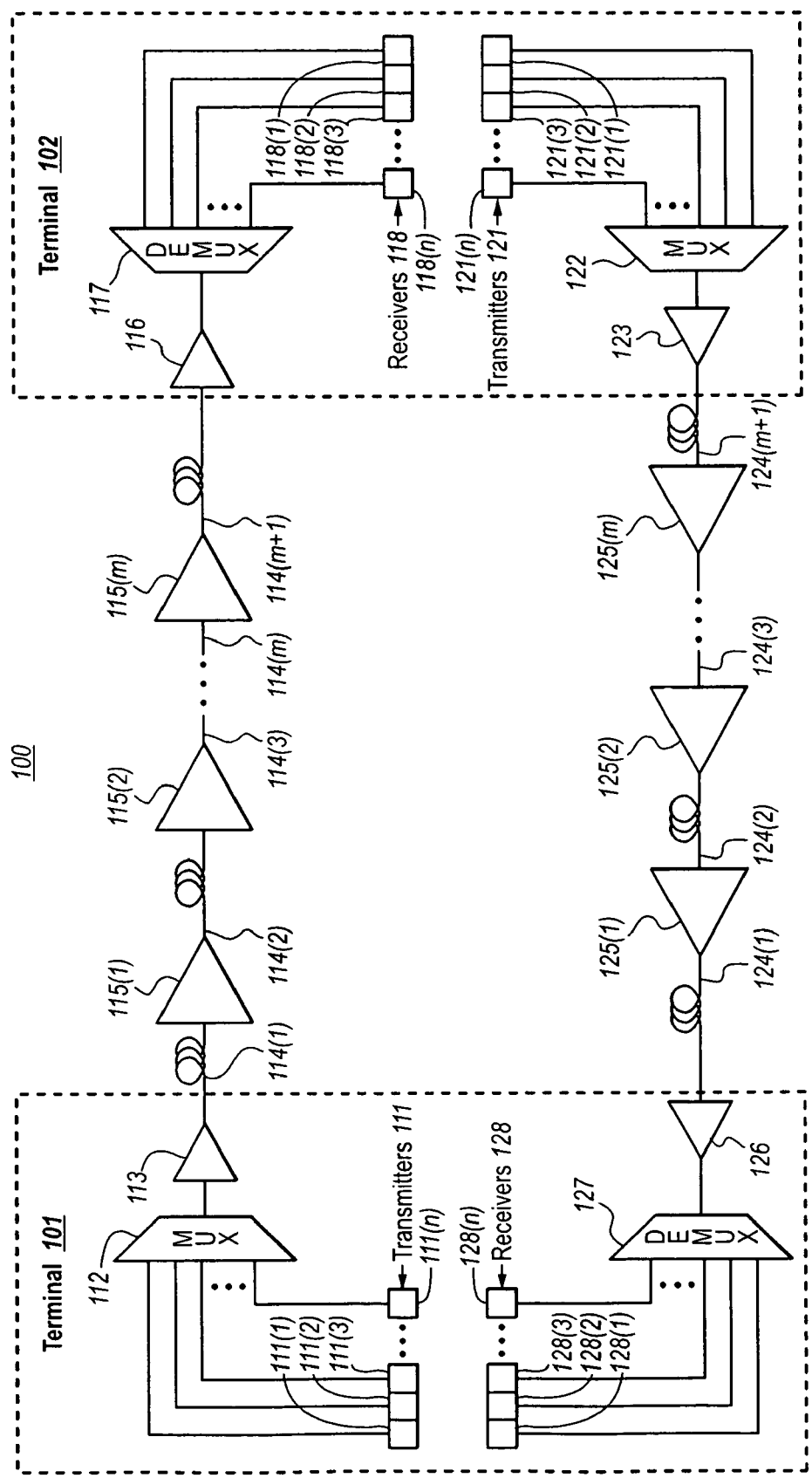
FIG. 1 schematically illustrates an example optical communications network including two remote optically communicating terminals.

FIG. 1 schematically illustrates an example optical communications system 100 in which the principles described herein may be employed. In the optical communications system 100, information is communicated between terminals 101 and 102 via the use of optical signals. For purposes of convention used within this application, optical signals travelling from the terminal 101 to terminal 102 will be referred to as being "eastern", whereas optical signals traveling from the terminal 102 to the terminal 101 will be referred to as being "western". The terms "eastern" and "western" are simply terms of art used to allow for easy distinction between the two optical signals traveling in opposite directions. The use of the terms "eastern" and "western" does not imply any actual geographical relation of components in FIG. 1, nor to any actual physical direction of optical signals. For instance, terminal 101 may be geographical located eastward of the terminal 102, even though the convention used herein has "eastern" optical signals traveling from the terminal 101 to the terminal 102.

In one embodiment, the optical signals are Wavelength Division Multiplexed (WDM), an example of which being Dense Wavelength Division Multiplexed (DWDM). In WDM or DWDM, information is communicated over each of multiple distinct optical channels called hereinafter "wavelength division optical channels". Each wavelength division optical channel is allocated a particular frequency for optical communication. Accordingly, in order to communicate using WDM or DWDM optical signals, the terminal 101 may have "n" optical transmitters 111 (including optical transmitters 111(1) through 111(n), where n is a positive integer), each optical transmitter for transmitting over a corresponding eastern wavelength division optical channel. Likewise, the terminal 102 may have "n" optical transmitters 121 including optical transmitters 121(1) through 121(n), each also for transmitting over a corresponding western wavelength division optical channel.

The principles described herein are not limited, however, to communications in which the number of eastern wavelength division optical channels is the same as the number of western wavelength division optical channels. Furthermore, the principles described herein are not limited to the precise structure of the each of the optical transmitters. However, lasers are an appropriate optical transmitter for transmitting at a particular frequency. That said, the optical transmitters may each even be multiple laser transmitters, and may be tunable within a frequency range.

As for the eastern channel for optical transmission in the eastern direction, the terminal 101 multiplexes each of the eastern optical signals from the optical transmitters 111 into a single eastern optical signal using optical multiplexer 112, which may then be optically amplified by an optional eastern optical amplifier 113 prior to being transmitted onto a first eastern fiber link 114(1).

There are a total of "m" repeaters 115 and "m+1" optical fiber links 114 between the terminals 101 and 102 in each of the eastern and western channels. However, there is no requirement for the number of repeaters in each of the eastern and western channels to be equal. In an unrepeated optical communications system, "m" would be zero such that there is but a single fiber link 114(1) and no repeaters between the terminals 101 and 102. In a repeated optical communications system, "m" would be one or greater. Each of the repeaters, if present, may consume electrical power to thereby amplify the eastern optical signal.

The eastern optical signal from the final optical fiber link 114(m+1) is then optionally amplified at the terminal 102 by the optional optical amplifier 116. The eastern optical signal is then demultiplexed into the various wavelength division optical channels using optical demultiplexer 117. The various wavelength division optical channels may then be received and processed by corresponding optical receivers 118 including receivers 118(1) through 118(n).

As for the western channel for optical transmission in the western direction, the terminal 102 multiplexes each of the western optical signals from the optical transmitters 121 (including optical transmitters 121(1) through 121(n)) into a single western optical signal using the optical multiplexer 122. The multiplexed optical signal may then be optically amplified by an optional western optical amplifier 123 prior to being transmitted onto a first fiber link 124(m+1). If the western optical channel is symmetric with the eastern optical channel, there are once again "m" repeaters 125 (labeled 125(1) through 125(m)), and "m+1" optical fiber links 124 (labeled 124(1) through 124(m+1)). Recall that in an unrepeated environment, "m" may be zero such that there is only one optical fiber link 124(1) and no repeaters 125 in the western channel.

The western optical signal from the final optical fiber link 124(1) is then optionally amplified at the terminal 101 by the optional optical amplifier 126. The western optical signal is then demultiplexed using optical demultiplexer 127, whereupon the individual wavelength division optical channels are received and processed by the receivers 128 (including receivers 128(1) through 128(n)). Terminals 101 and/or 102 do not require all the elements shown in optical communication system 100. For example, optical amplifiers 113, 116, 123, and/or 126 might not be used in some configurations. Furthermore, if present, each of the corresponding optical amplifiers 113, 116, 123 and/or 126 may be a combination of multiple optical amplifiers if desired.

In most cases, the optical path length between repeaters is approximately the same. The distance between repeaters will depend on the total terminal-to-terminal optical path distance, the data rate, the quality of the optical fiber, the loss-characteristics of the fiber, the number of repeaters (if any), the amount of electrical power deliverable to each repeater (if there are repeaters), and so forth. However, a typical optical path length between repeaters (or from terminal to terminal in an unrepeated system) for high-quality single mode fiber might be several tens of kilometers or more. That said, the principles described herein are not limited to any particular optical path distances between repeaters, nor are they limited to repeater systems in which the optical path distances are the same from one repeated segment to the next.

The optical communications system 100 is represented in simplified form for purpose of illustration and example only. The principles described herein may extend to much more complex optical communications systems. The principles described herein may apply to optical communications in which there are multiple fiber pairs, each for communicating multiplexed WDM optical signals. Furthermore, the principles described herein also apply to optical communications in which there are one or more branching nodes that split one or more fiber pairs and/or wavelength division optical channels in one direction, and one or more fiber pairs and/or wavelength division optical channels in another direction.

In order to avoid confusion, the optical fiber links 114(1) through 114(m+1) and 124(1) through 124(m+1) may be referred to herein as an "inter-repeater" optical fiber link. The larger optical fiber link spanning the entire distance from terminal 101 to terminal 102 may be referred to herein as the "inter-terminal" optical fiber link.

As an optical signal travels through an optical fiber, the optical signal experiences chromatic dispersion (also called "material dispersion"). Unless properly compensated for, excessive accumulated chromatic dispersion results in significant increases in the Bit Error Rate (BER). One conventional mechanism for at least partially compensating material dispersion is to design compensation cycles in which, for each compensation cycle, there is a balance of positive dispersion fiber and negative dispersion fiber in each inter-repeater optical fiber link. A given compensation cycle might be a single inter-repeater optical fiber link, but might more often include multiple contiguous inter-repeater optical fiber links.

Figure 2A:
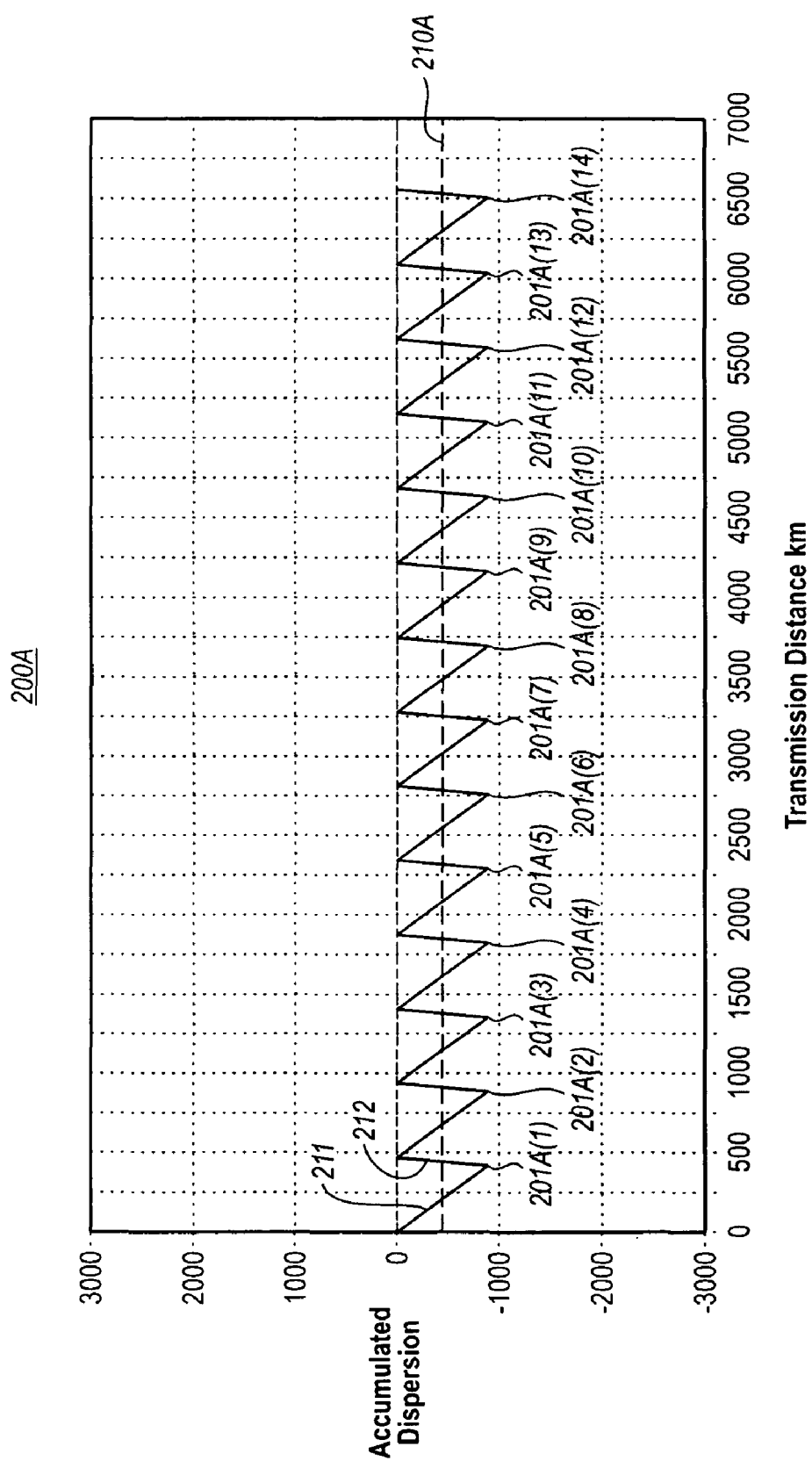
FIG. 2A illustrates a dispersion map in the specific case in which the chromatic dispersion is exactly compensated for in each of the inter-repeater optical fiber links in the case where there are 14 compensation cycles and in which the optical path of each of the compensation cycle is equal.

FIG. 2A illustrates a dispersion map 200A in the specific case in which the material dispersion is exactly compensated for in each of the compensation cycles in the case where there are 14 total compensation cycles, and in which the optical path of each of the compensation cycles is equal. For instance, the dispersion map 200A includes 14 saw tooth forms 201A(1) through 201A(14), each corresponding to the dispersion that would occur in an exactly compensated channel in the respective compensation cycle.

In each of the compensation cycles, the material dispersion approximately linearly accumulates (represented by the negatively-sloped line of each saw tooth-like form), followed by a compensating material dispersion (represented by the relatively short and positively-sloped line of each saw tooth-like form), resulting in a return of material dispersion to zero at each repeater, and at the receiving terminal. For instance, in optical fiber link 114(1), there is some negative dispersion optical fiber that results in negatively-sloped edge 211 having a negative map slope and some positive dispersion optical fiber that results in positively-sloped edge 212 having a positive map slope.

In this description, the term "map slope" refers to the slope of lines on the dispersion map itself when plotting accumulated dispersion on the y-axis versus transmitted distance on the x-axis. Thus, the term "map slope" is not to be confused with the term "dispersion slope". As the term is used herein, "dispersion slope" refers to the slope of a line when plotted on a graph of dispersion per unit length on the y-axis and wavelength on the x-axis. A "positive dispersion slope" thus refers to a tendency (such as that in an optical fiber) in which longer wavelengths of optical light tend to have more accumulated dispersion, and optical signals of shorter wavelengths tend to have less accumulated dispersion. In contrast, a "negative dispersion slope" thus refers to a tendency (such as that in an optical fiber) in which longer wavelengths of optical light tend to have less accumulated dispersion, and optical signals of shorter wavelengths tend to have more accumulated dispersion. The distinction between "map slope" and "dispersion slope" will become clearer when discussing the dispersion map of FIG. 2D.

Figure 2B:
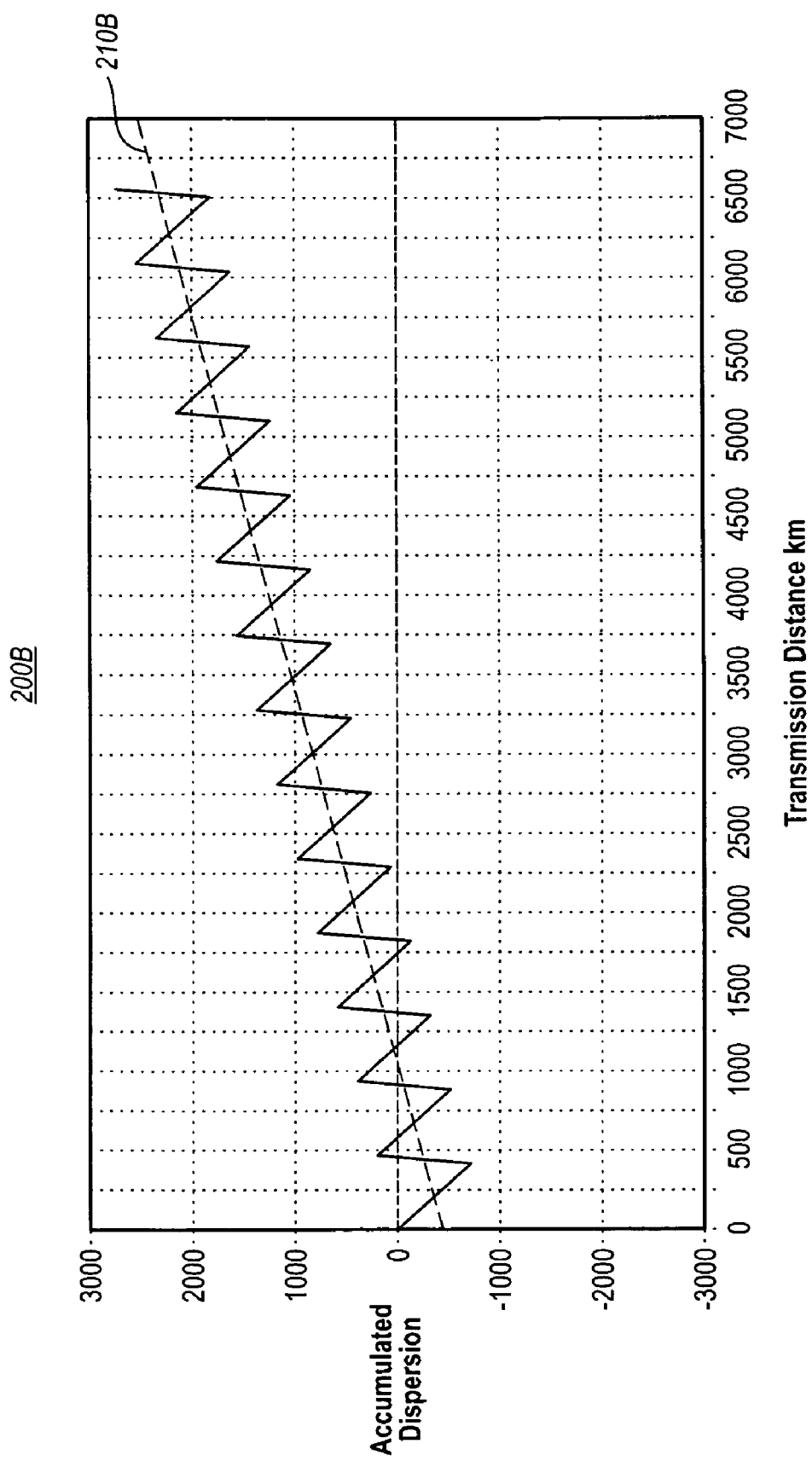
FIG. 2B illustrates a similar dispersion map as is shown in FIG. 2A, except with under-compensation of chromatic dispersion resulting in a positive trend slope.
Figure 2C:
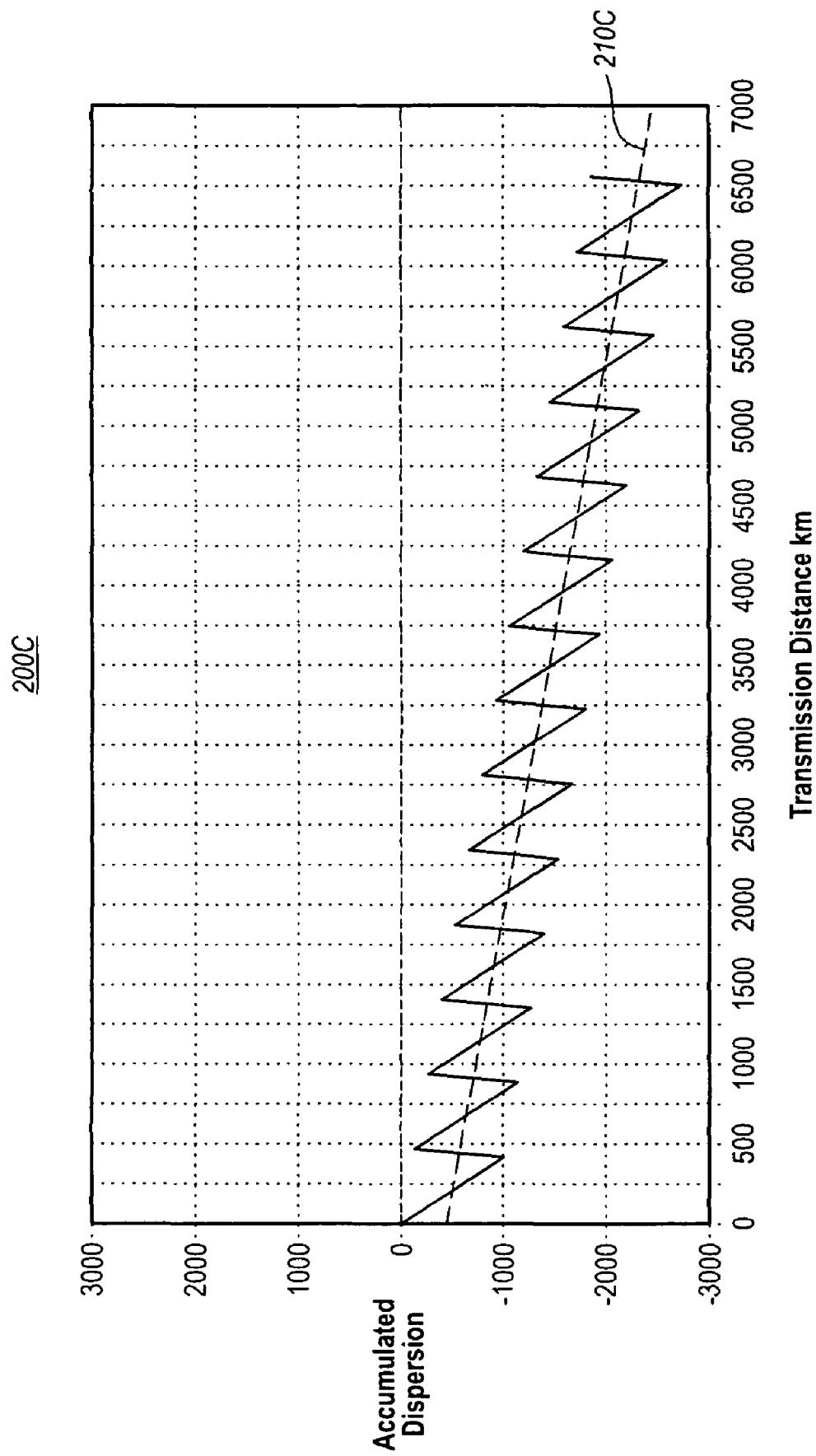
FIG. 2C illustrates a similar dispersion map as is shown in FIG. 2A, except with over-compensation of chromatic dispersion resulting in a negative trend slope.
Figure 2D:
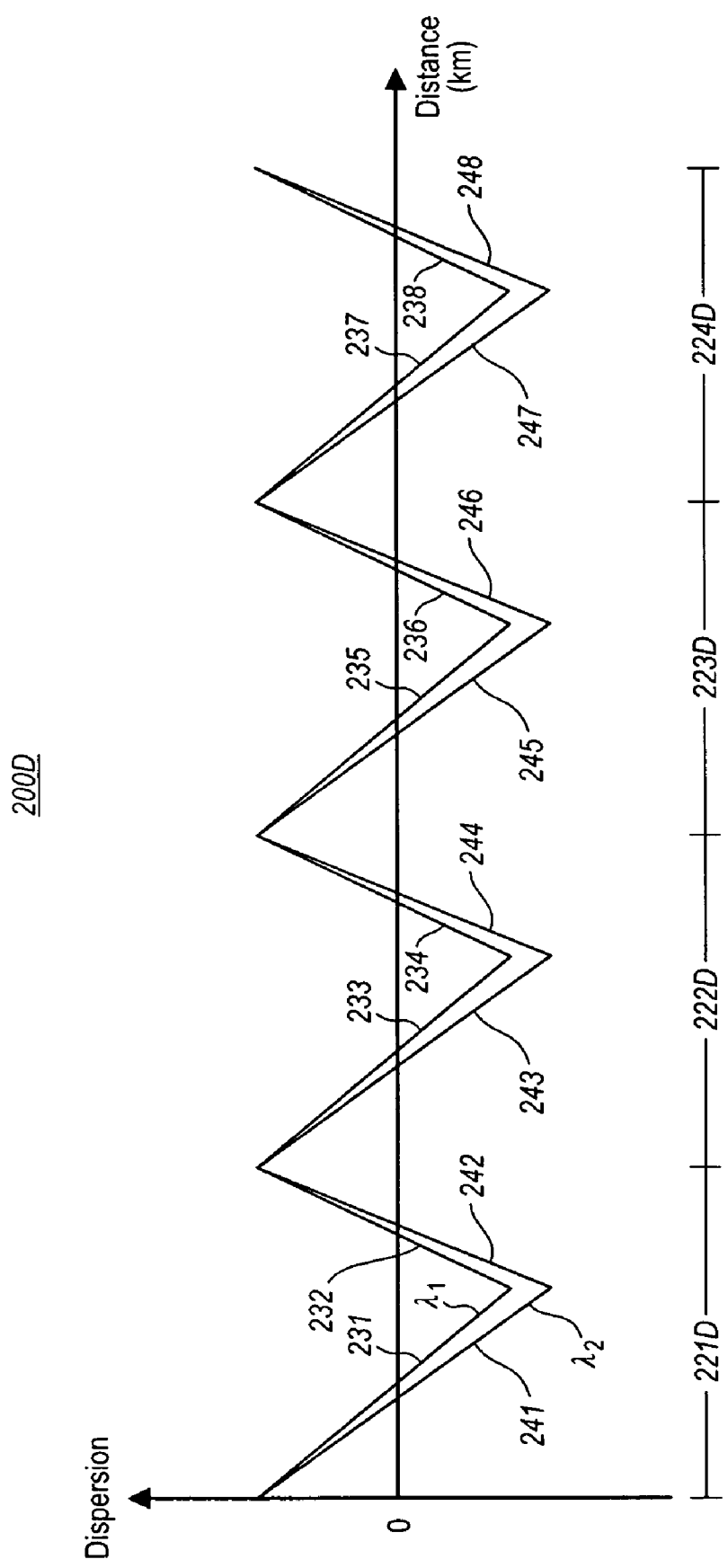
FIG. 2D illustrates a dispersion map that might be associated with a dispersion-managed optical fiber system.

The graph 200D of FIG. 2D shows accumulated dispersion on the y-axis and distance on the x-axis. The graph 200D actually shows four compensation cycles 221D, 222D, 223D and 224D. The graph 200D also shows two almost coincident dispersion maps, one for each of two wavelengths. For instance, lines 231 through 238 form an upper dispersion map, and lines 241 through 248 form a lower dispersion map.

Compensation cycle 221D will now be evaluated in detail first with respect to the upper dispersion map corresponding to lines 231 and 232. To begin with, an optical signal having one wavelength (for the purposes of this example, called a "first" wavelength or "$\lambda_1$") passes through negative dispersion optical fiber resulting in line 231 that has a negative map slope. The optical signal of the first wavelength then passes through a positive dispersion fiber resulting in line 232 having a positive map slope. In this case, the dispersion-managed compensation cycle 221D is designed so that the positive and negative dispersion fibers are balanced exactly so that optical signal of the first wavelength has precisely the same accumulated dispersion at the beginning and end of the compensation cycle 221D.

Compensation cycle 221D will now be evaluated in detail with respect to the lower dispersion map corresponding to lines 241 and 242. To begin with, an optical signal having a second wavelength (for purposes of this example, called a "second" wavelength or "$\lambda_2$" to distinguish from the first wavelength experiences the negative dispersion optical fiber first, resulting in line 241 having a negative map slope. However, in this case, the decline in accumulated dispersion is steeper for the second wavelength than it was for the optical signal of the first wavelength. Thus, the line 241 has a more negative map slope than the line 231. If the second wavelength has a longer wavelength than the first wavelength, the optical fiber causing the dispersions 231 and 241 would be said to have a "negative dispersion slope" since longer wavelengths of optical light experience less positive (or equivalently in this case more negative) dispersion per unit length of fiber. If the second wavelength has a shorter wavelength than the first wavelength, the optical fiber causing the dispersions 231 and 241 would be said to have a "positive dispersion slope" since longer wavelengths of optical light experience more positive (or equivalently in this case less negative) dispersion per unit length of fiber.

The optical signal of the second wavelength then experiences the positive dispersion optical fiber, resulting in line 242 having a positive map slope. However, in this case, the increase in accumulated dispersion is steeper for the second wavelength than it was for the optical signal of the first wavelength. Thus, the line 242 has a more positive map slope than the line 232. Significantly, the steepness in the rate of accumulated dispersion increase is sufficient to overcome the steepness in the decline of the accumulated dispersion. Thus, at the end of the compensation cycle, the optical signal returns to the same amount of accumulated dispersion regardless of the optical signal wavelength. Thus, the compensation cycle is referred to as "dispersion-managed". If the second wavelength has a longer wavelength than the first wavelength, the optical fiber causing the dispersions 232 and 242 would be said to have a "positive dispersion slope" since longer wavelengths of optical light experience more positive (or equivalently in other cases less negative) dispersion per unit length of fiber. If the second wavelength has a shorter wavelength than the first wavelength, the optical fiber causing the dispersions 232 and 242 would be said to have a "negative dispersion slope" since longer wavelengths of optical light experience less positive (or equivalently in other cases more negative) dispersion per unit length of fiber.

Thus, dispersion-managed systems include compensation cycles in which dispersion itself is compensated for using a balance of positive and negative dispersion fibers. In addition, in order to reduce wavelength dependencies, if the positive dispersion fiber has a positive dispersion slope, the negative dispersion fiber has a negative dispersion slope. On the other hand, if the positive dispersion fiber has a negative dispersion slope, the negative dispersion fiber has a positive dispersion slope.

In conventional submarine optical fiber systems that are not dispersion-managed, negative dispersion optical fiber precedes the positive dispersion fiber in each compensation cycle as is illustrated in FIGS. 2A through 2D. Also, in these conventional non-dispersion-managed systems, both fiber types have a positive dispersion slope. Therefore, wavelength dependencies cannot be compensated for. Instead, dispersion maps for various wavelengths tend to diverge as will be described with respect to FIG. 3. In terrestrial optical fiber systems, a compensation cycle tends to include positive dispersion fiber followed by negative dispersion fiber. The principles described herein are applicable to terrestrial, submarine, and mixed terrestrial and submarine optical fiber systems. Terrestrial systems tend to have more a variable length compensation cycle, but the principles described herein are applicable.

In dispersion managed fiber systems, positive dispersion fiber precedes the negative dispersion fiber because the positive fiber has a larger core area. In such systems, as previously mentioned, the positive dispersion fiber has positive dispersion slope while the negative dispersion fiber has negative dispersion slope. Thus, both dispersion and dispersion slope are compensated.

Although the dispersion profile in each compensation cycle are shown as having a similar form (i.e., a saw tooth like form), there may also be cases in which there are different combinations and/or ordering of D+ and D− optical fiber in different inter-repeater optical fiber links 114(1) through 114 (14). This would result in somewhat different forms but if the optical fiber link is exactly compensated, the accumulated material dispersion would still return to approximately zero at each repeater.

As the term is used herein, a "map trend slope" is the slope of a trend line that passes along the length of the dispersion map and along the middle dispersion map length. For example, in FIG. 2A, such a line would be horizontal as represented by the trend line 210A.

A horizontal trend line might occur is some fairly specific situations. For example, in conventional dispersion-managed optical fiber systems, the balance of D+optical fiber and the D− optical fiber manages to exactly compensate for material dispersion regardless of the wavelength of the optical signal (at least within the limits of the wavelengths used for transmission).

Dispersion-managed fiber is, however, a fairly recent development. Most of the presently installed submarine optical fiber systems incorporate optical fiber links that are not dispersion-managed. Accordingly, for some wavelengths of optical signal, over-compensation (in case of each compensation cycle having negative dispersion fiber followed by compensating positive dispersion fiber) or under-compensation (in case of each compensation cycle having positive dispersion fiber followed by compensating negative dispersion fiber) occurs in which the dispersion map has a trend line that is positive. For instance, FIG. 2B illustrates a similar dispersion map 200B as is shown in FIG. 2A, except now the dispersion map trends upwards as represented by the trend line 210B. On the other hand, for some wavelengths of optical signal, a negatively-sloped trend line results from under-compensation (in case of each compensation cycle having negative dispersion fiber followed by compensating positive dispersion fiber) or over-compensation (in case of each compensation cycle having positive dispersion fiber followed by compensating negative dispersion fiber). For instance, FIG. 2C illustrates a similar dispersion map 200C as is shown in FIG. 2A, except now the trend line 210C slopes downwards.

Figure 3:
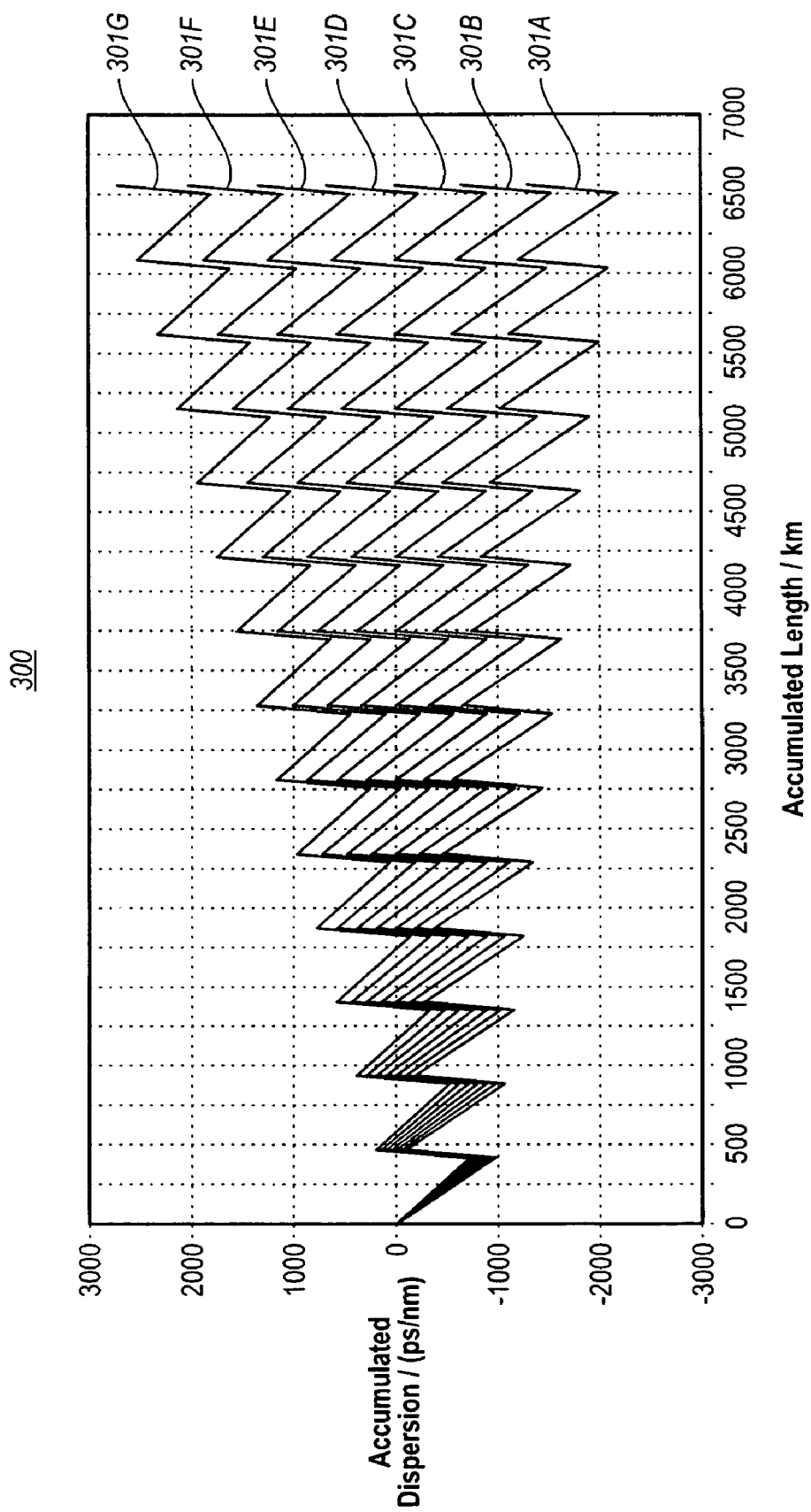
FIG. 3 illustrates a graph showing multiple diverging dispersion maps for a variety of wavelengths in the C-band in the case where there is not pre-compensation of chromatic dispersion and in the case in which the optical fiber link is not dispersion-managed.

FIG. 3 illustrates a graph 300 showing dispersion maps 301A through 301G for a variety of wavelengths in the C-band. In this example, the wavelengths correspond to the following wavelengths: 1546.92 nanometers (nm), 1548.51 nm, 1550.12 nm, 1551.72 nm, 1553.33 nm, 1554.94 nm, 1556.55 nm and 1558.17 nm. In this example, longer wavelengths (e.g., corresponding to the dispersion map 301G) tend to have more positive trend slopes, whereas shorter wavelengths (e.g., corresponding to the dispersion map 301A) tend to have more negative trend slopes. Although FIG. 3 is discussed with respect to wavelengths in the C-band, the principles described herein may be broadly applied to optical signals in any band of m wavelengths.

Figure 4:
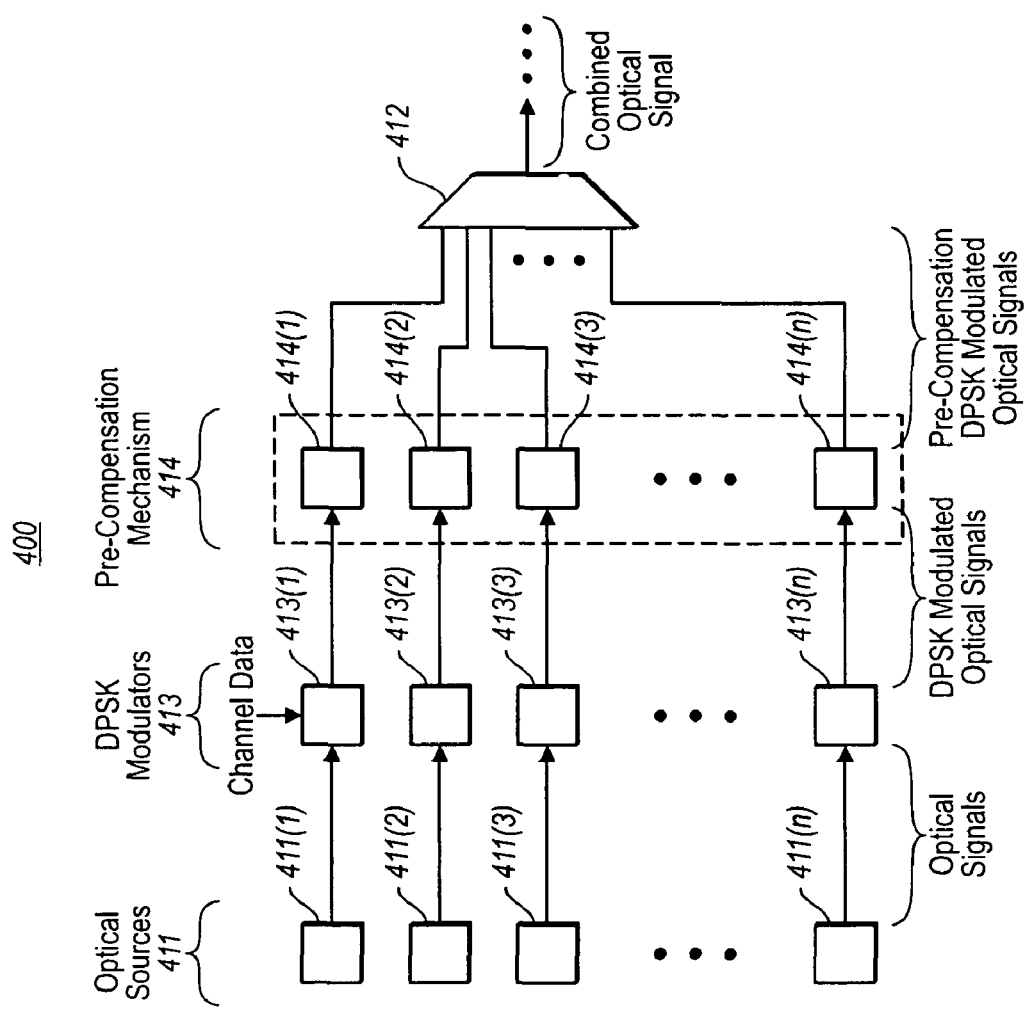
FIG. 4 illustrates an optical terminal for transmitting an optical signal over an extended optical fiber link.

FIG. 4 illustrates an optical terminal 400 for transmitting an optical signal over an extended optical fiber link. For instance, the optical terminal 400 might be the terminal 101 of FIG. 1 if transmitting an eastern optical signal from terminal 101 to terminal 102. In the case of an eastern optical signal, the terminal 101 is the transmitting terminal and the terminal 102 is the receiving terminal. Alternatively, the optical terminal 400 might be the terminal 102 of FIG. 1 if transmitting a western optical signal from terminal 102 to terminal 101. In the case of a western optical signal, the terminal 102 is the transmitting terminal and the terminal 101 is the receiving terminal.

The terminal 400 includes "n" optical sources (or "transmitters") 411(1) through 411(n) and an optical multiplexer 412 for combining the WDM optical signals into a single optical fiber in preparation for transmission. For instance, if the terminal 400 was the terminal 101 of FIG. 1, the optical sources 411(1) through 411(n) may be the same as the optical transmitters 111(1) through 111(n) of FIG. 1, and the optical multiplexer 412 might be the optical multiplexer 112 of FIG. 1. Likewise, if the terminal 400 was the terminal 102 of FIG. 1, the optical sources 411(1) through 411(n) may be the same as the optical transmitters 121(1) through 121(n) of FIG. 1, and the optical multiplexer 412 might be the optical multiplexer 122 of FIG. 1.

Each of the optical sources 411(1) through 411(n) (collectively referred to as optical sources 411) are for communicating over a corresponding Wavelength Division Multiplexed (WDM) wavelength channel at a bit rate of at least 20 gigabits per second (Gbit/s). The WDM wavelength channel might be a Dense WDM (or DWDM) channel, and may perhaps be for communicating wavelength channels in the C-band. The per-channel bit rates could be any bit rate 20 Gbit/s or higher such as, for example, 20 Gbit/s, 40 Gbit/s, 80 Gbit/s, 100 Gbit/s or others therebetween or higher. In one embodiment that will be described hereinafter, the bit rate might be, for example, 20 Gbit/s with a channel separation of 50 GHz.

For each channel, there is an at least 2 Phase Shift Keying (PSK) modulation mechanisms 413 that operates to modulate data on the optical signal for each of the WDM wavelength. For example PSK modulation mechanisms 413 include PSK modulator 113(1) through 113(n) respectively for each channel. For each corresponding channel, the PSK modulator receives the data for that channel, and modulates the optical signal from the corresponding optical source such that the optical source transmits the data modulated using at least 2 PSK modulation mechanism.

In one embodiment, the at least 2 PSK modulation mechanism is exactly 2 PSK, or in other words Differential PSK or (DPSK). DPSK is advantageous because it allows for an approximate three decibel (dB) Optical Signal-to-Noise Ratio (OSNR) gain over standard Amplitude Shift Keying (ASK). However, all DPSK channels at 20 Gbit/s over extended distances is not conventionally employed. The principles described herein use refined pre-compensation of dispersion to allow all DPSK channels to become more feasible. The same refined pre-compensation of chromatic dispersion may be employed to enable higher order PSK modulation such as, for example, QPSK (or 4 PSK), 8 PSK, 16 PSK or other higher-order PSK modulations. The same refined pre-compensation of chromatic dispersion may also be employed to enable faster per-channel bit rates.

For instance, in FIG. 4, pre-compensation mechanism 114 operates to pre-compensate for chromatic dispersion for at least a majority, and preferably all, of the WDM wavelength channels. In one embodiment, where each channel is pre-compensated independently, corresponding per-channel pre-compensation mechanism 114(1) through 114(n) may serve to pre-compensate each channel independently.

Figure 9:
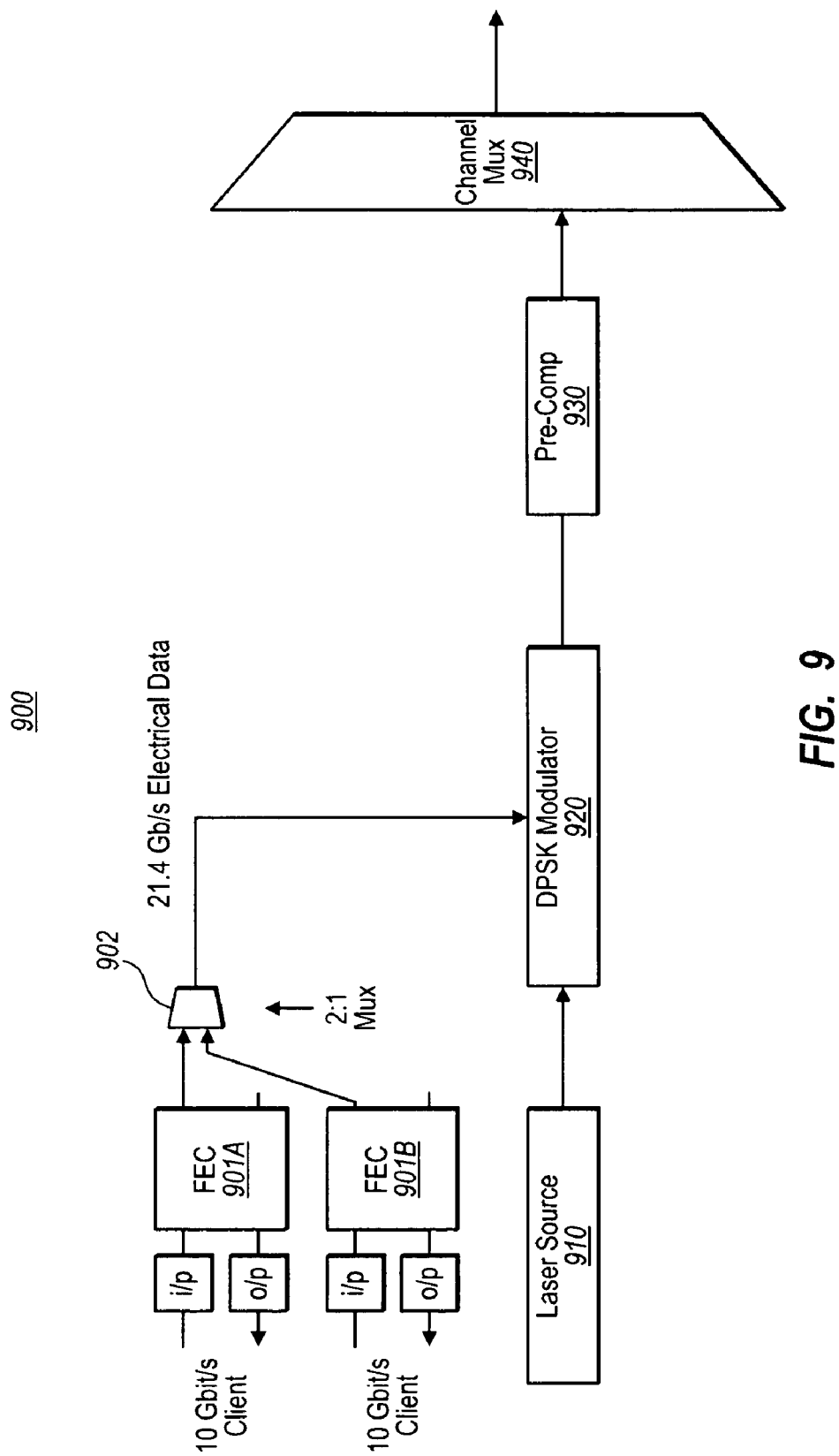
FIG. 9 illustrates a specific schematic diagram of multiple data channels being combined to drive PSK modulation of an optical channel.

FIG. 9 illustrates a more specific embodiment 900 in which several constituent channels are combined into a single data signal that used to drive a PSK modulator (in this case a DPSK modulator 920). Specifically, the constituent data channels in this example are two 10 Gbit/s data signals that are subjected to Forward Error Correction 901A and 901B, and combined by 2:1 multiplexer 902. The DPSK modulator 920 thereby modulates a laser source 910, and the modulated signal is then subjected to pre-compensation 930 prior to being multiplexed using multiplexer 940.

Figure 10:
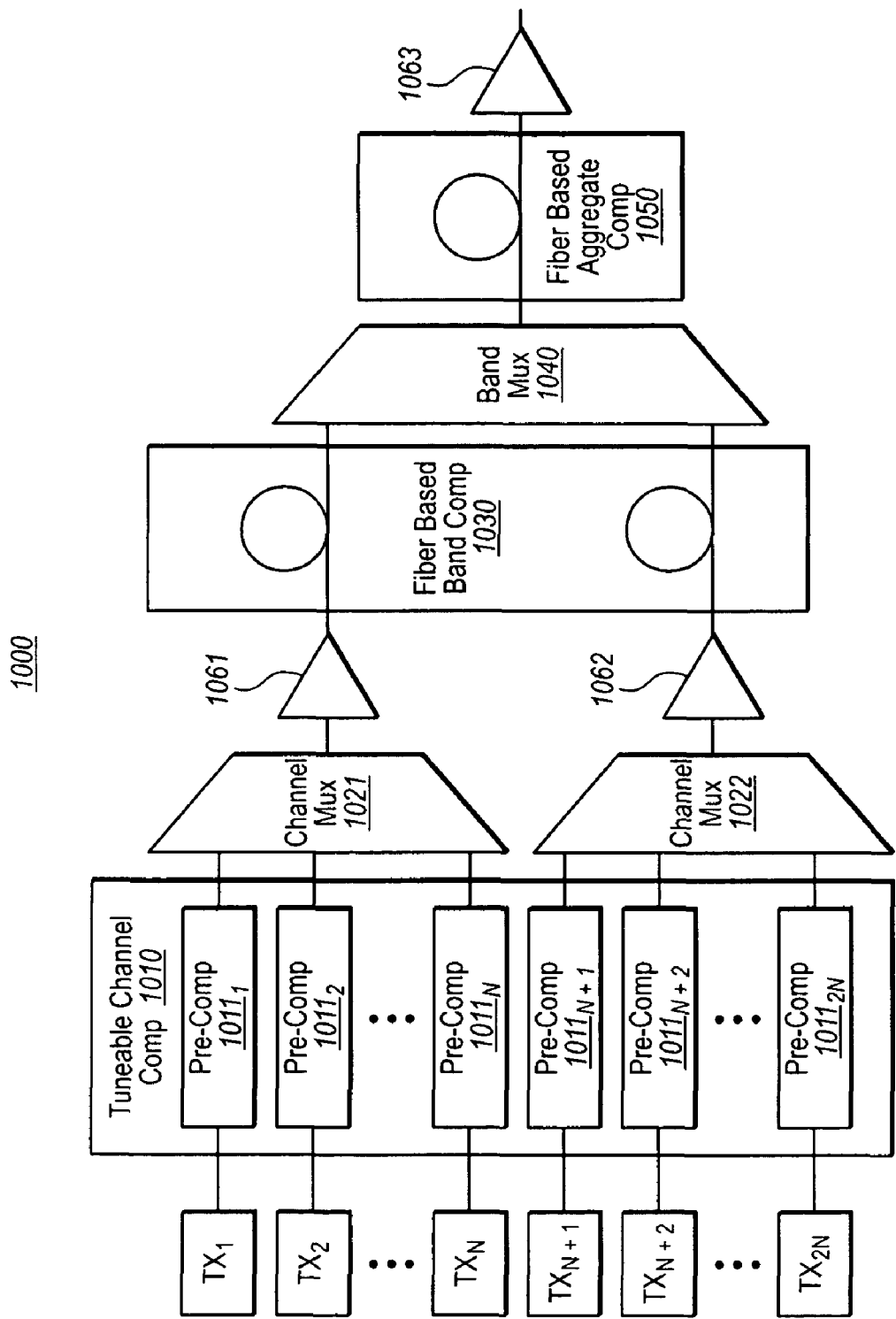
FIG. 10 illustrates a specific schematic diagram of pre-compensation and multiplexing performed at the transmit terminal.

FIG. 10 illustrates a transmission system 1000 that shows how the modulated signals may be pre-compensated and multiplexed in one embodiment. In this case, signals $TX_1$ through $TX_{2N}$ represent PSK modulated optical signals at 20 Gbit/s or above. If integrated with FIG. 9, for example, the optical signals $TX_1$ through $TX_{2N}$ represent modulated and forward error corrected optical signal at 21.4 Gbit/s bit rate. A tunable channel compensation mechanism 1010 has pre-compensation components $1011_1$ through $1011_{2N}$ that pre-compensate the corresponding optical signal on a per-channel basis.

The pre-compensated signals from one band of wavelengths are then multiplexed by channel multiplexer 1021. The pre-compensated signals from another band of wavelengths are then multiplexed by channel multiplexer 1022. Of course, there may be different hierarchies of multiplexers. In this case, the optical signals are multiplexed into only two different bands. The combined optical signal bands are then perhaps subjected to pre-compensation at the band level using fiber-based band compensation 1030. A band multiplexer 1040 then combines these optical signals into a single optical signal whereupon fiber-based aggregate pre-compensation 1050 may be performed on the entire range of optical signal channels. Thus, pre-compensation may be flexibly controlled by controlling each of the pre-compensation mechanism at each level in the hierarchy. Optional amplifiers 1061, 1062 and 1063 may also be present to amplify the optical signal.

Figure 11:
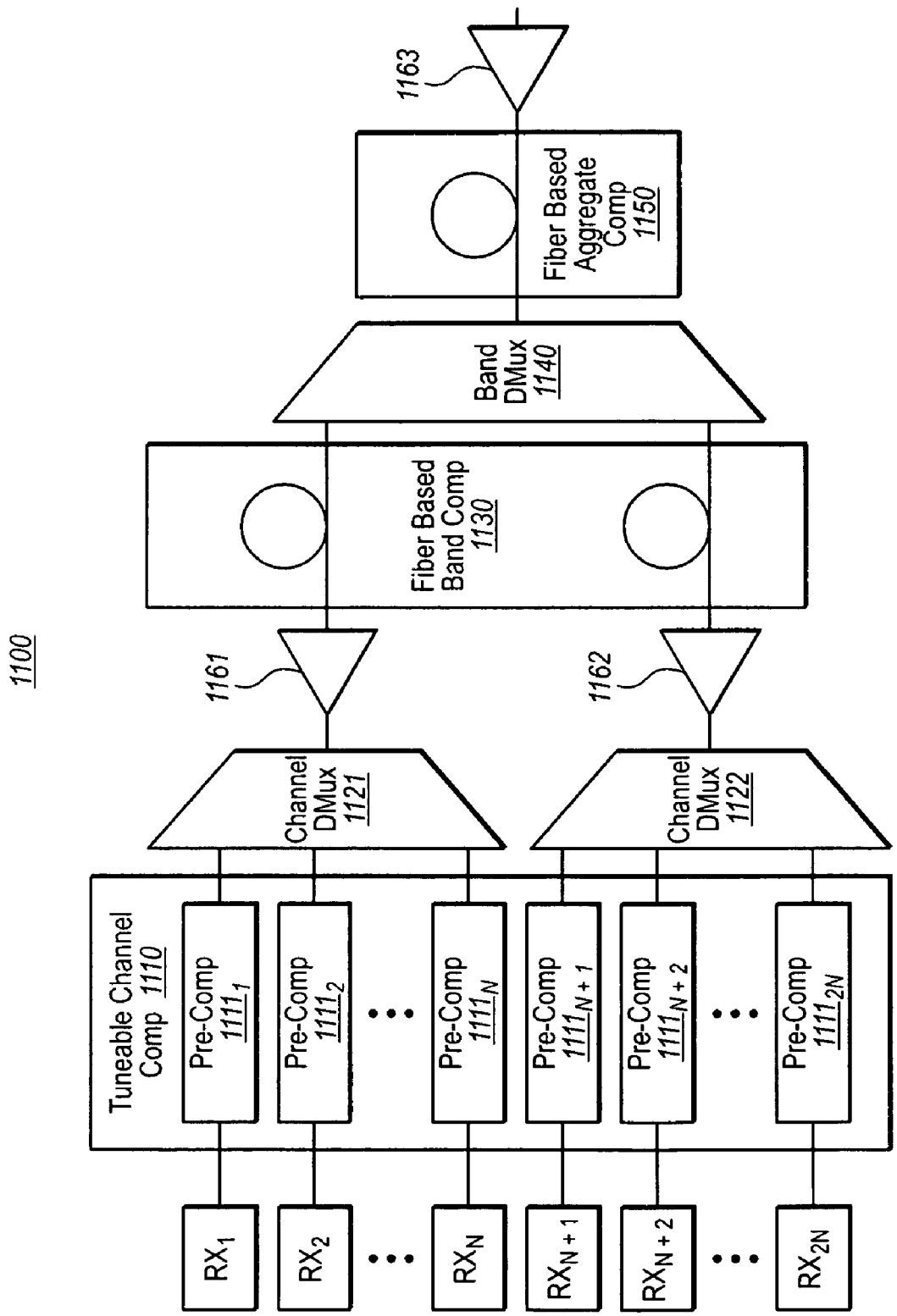
FIG. 11 illustrates a specific schematic diagram of post-compensation and demultiplexing performed at the receive terminal.

FIG. 11 illustrates a reception system 1100 that mirrors the transmission system 1000 of FIG. 10, allowing post-compensation to be performed at various levels as well. Upon receiving an optical signal, fiber-based aggregate post-compensation 1150 post-compensates the entire range of optical channels. A band demultiplexer 1140 then separates out the various optical bands. The different bands may then be subjected to further post-compensation at the band level using fiber-based band post-compensation component 1130. The various optical signal channels may then be separated using channel demultiplexers 1121 and 1122, whereupon channel-specific post-compensation may be performed using tunable channel post-composition mechanism 1110 that includes post-compensation mechanism $1111_1$ through $1111_{2N}$ for each received optical channel signal $RX_1$ through $RX_{2N}$. Thus, post-compensation may also be flexibly controlled by controlling each of the pre-compensation mechanism at each level in the hierarchy. Optional amplifiers 1161, 1162 and 1163 may also be present to amplify the optical signal.

Figure 5:
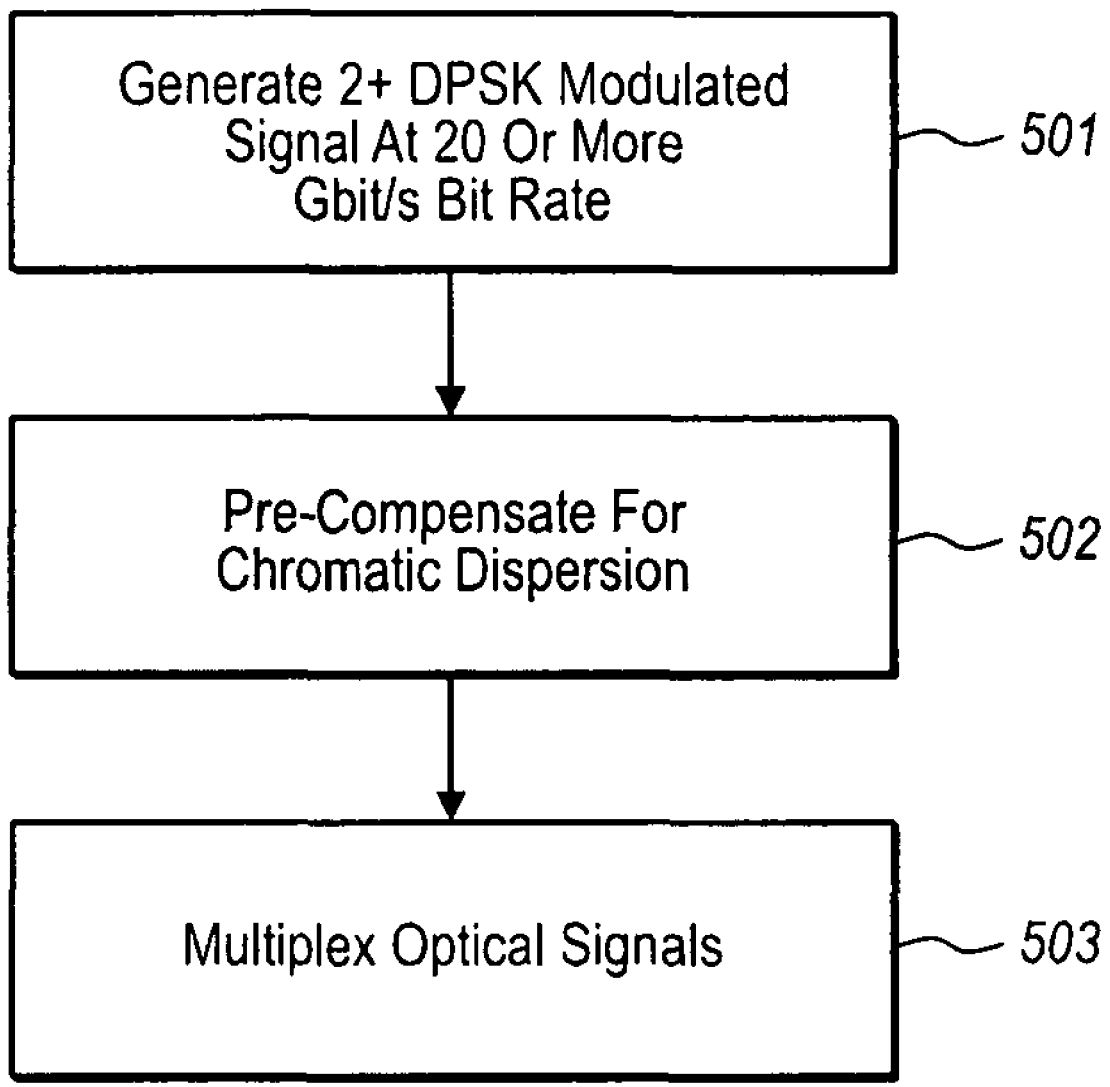
FIG. 5 illustrates a flowchart of a method for transmitting an optical signal from an optical terminal such as the optical terminal of FIG. 4.

FIG. 5 illustrates a flowchart of a method 500 for transmitting an optical signal from an optical terminal such as the optical terminal 400 of FIG. 4. An at least 2 PSK modulated signal is generated for each WDM wavelength channel at a bit rate of at least 20 Gbit/s (act 501). Referring to FIG. 4, for example, generally speaking where "k" is any integer from 1 to n, inclusive, the PSK modulator 413(k) serves to modulate the optical source 411(k) to generate an at least 2 PSK modulated signal for the k'th channel.

The generated signal is then subjected to pre-compensation for accumulated dispersion (act 502). This is performed for a majority, if not all, of the channels. Referring to FIG. 4 and once again speaking generally, the optical signal from optical source 411(k) is pre-compensated for using the pre-compensation mechanism 414(k), wherein k is any integer from 1 to n. The generated and pre-compensated signals may then be optically multiplexed (act 503) in preparation for transmission onto an optical fiber.

In one embodiment, the pre-compensation mechanism 114 performs pre-compensation of the optical signals based on an intended transmission distance of the optical signal. Typically, the transmission distance of the optical signal in an optical fiber link is generally known. For instance, in the dispersion maps of FIGS. 2A, 2B, 2C and 3, and in those that will later be described, the intended transmission distance is 6600 kilometers, which is within the range of longer distances that might be served by a trans-oceanic inter-continental submarine optical fiber link. However, there is nothing special about this 6600 kilometer example as different trans-oceanic submarine optical fiber links may have different distances as is suitable given the distance between the respective terminals. The principles described herein apply for other long distance transmissions as well.

The precision in the amount of pre-compensation needed to minimize bit error rate depends on the per-channel bit rate. The higher the per-channel bit rate, the more precise the pre-compensation needed. At some bit rates, there might even be some balancing of the pre-compensation (that occurs at the transmitting terminal) and the post-compensation (that occurs at the receiving terminal). In the case of DPSK, QPSK and higher-order PSK modulation, the pre-compensation and post-compensation can be balanced such that they are approximately the same. However, there might be some variance in the pre-compensation and post-compensation from this theoretical balance point to account for real asymmetries that might exist in the dispersion map itself. In that case, perhaps the pre-compensation should be more adaptive using perhaps a closed control loop to refine the pre-compensation (and post-compensation) through several iterations of bit error rate checking until an acceptable bit error rate is achieved. In some situations, it may be sufficient to simply perform a good initial estimate about the amount of pre-compensation needed. Regardless of the precision needed in the pre-compensation, the formulation of the good initial estimate for pre-compensation serves to make pre-compensation of the channel more efficient.

In one embodiment, the initial estimate of the pre-compensation is a function of the intended transmission distance. For instance, for any given channel, sufficient pre-compensation is employed such that a minimum accumulate dispersion occurs at a central region of the length of the intended transmission distance. For instance, if there is a 6600 kilometer optical path distance in the optical fiber link between the transmitting terminal and the receiving terminal, the calculation of the precise initial pre-compensation amount may take into account the 6600 kilometers intended transmission distance, and the expected dispersion characteristics for that channel. The initial pre-compensation amount would be sufficient that the point of minimum absolute accumulated dispersion occurs at appropriate 3300 kilometers into the optical path. Generally speaking, the longer the transmission distance, the initial guess should likely be closer to the mid-point in the transmission distance.

That said, other initial guesses may be suitable as well depending on how defined. For instance, an acceptable initial pre-compensation might consider whether or not the initial pre-compensation is within a more general central region. The central region might be, for example, between 30 and 70 percent of the length of the intended transmission distance, between 40 and 60 percent of the length of the intended transmission distance, between 45 and 55 percent of the length of the intended transmission distance, or even between 48 and 52 percent of the length of the intended transmission distance. The central region might alternatively be defined based on the distance from the midpoint of the transmission path. For example, the central region might span 1000 kilometers, 500 kilometers, 200 kilometers, or other absolute distances from the midpoint. The acceptable central region might alternatively be calculated based on more complex functions as well. The acceptable size of this central region will depend on the particular application. To keep things simple in this example, however, let us presume that the initial estimate for pre-compensation is such that the minimum accumulated dispersion is attempted to be at the approximate mid-point of the intended transmission distance.

Figure 6:
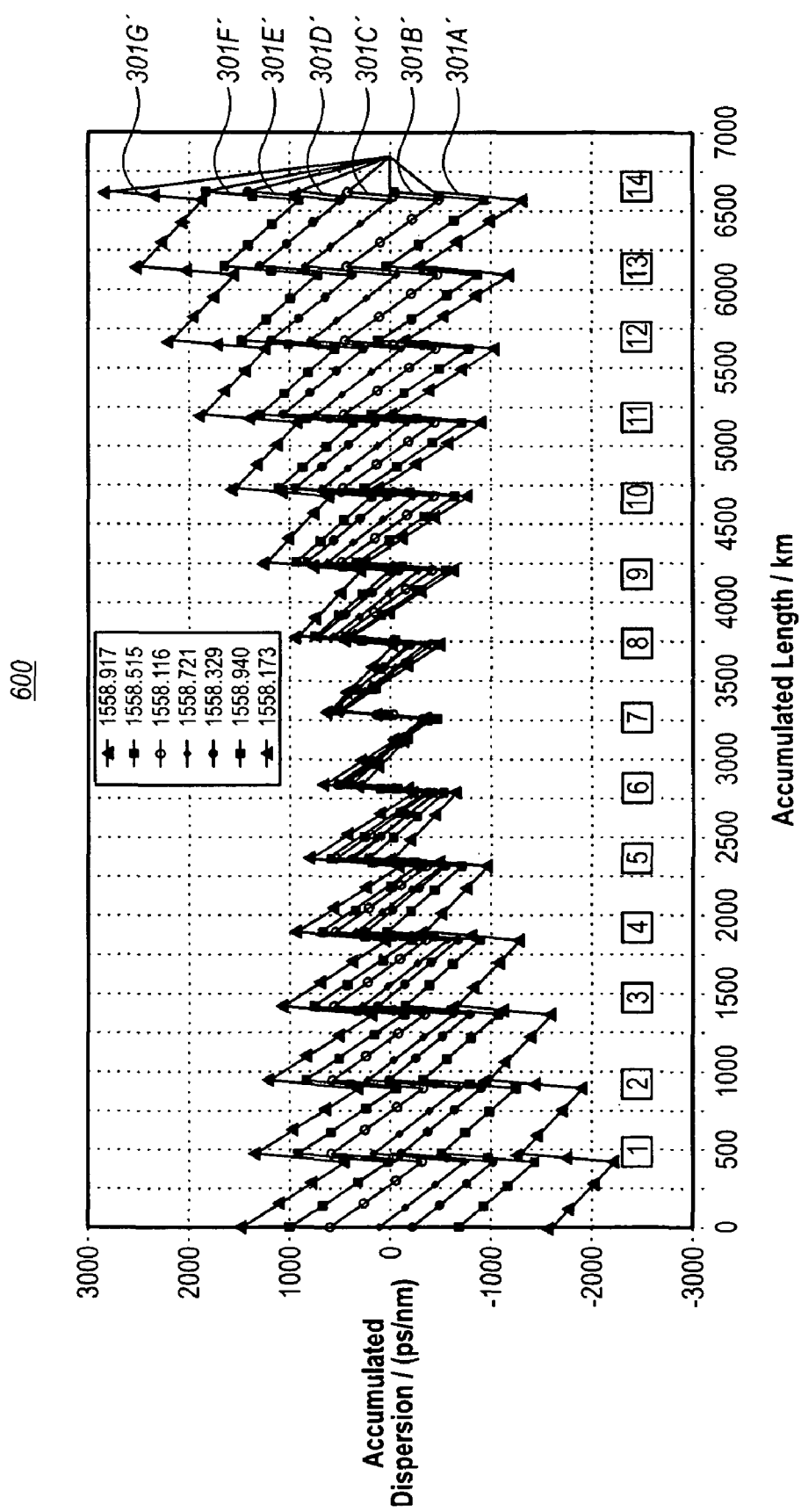
FIG. 6 illustrates a graph of the various dispersion maps of FIG. 3, except this time as they might appear at the stage in which pre-compensation that aims to minimize accumulated dispersion at the approximate mid-point of the intended transmission distance.

FIG. 6 illustrates a graph 600 of the various dispersion maps 301A' through 301G' as they might appear at the stage in which the pre-compensation is at its initial estimate that aims to minimize accumulated dispersion at the approximate mid point. Note how all of the dispersion maps 301A' through 301G' converge at the appropriate mid-point of the transmission distance at 3300 kilometers, at which point the dispersion maps are bisected by the zero dispersion line that separates the positive an negative dispersion regions. If further pre-compensation adaptation is performed (as described in further detail below with respect to FIGS. 7 and 8), then each dispersion map 301A' through 301G' might independently be shifted up or down slightly until the desired bit error rate is attained for each channel. In one embodiment, the pre-compensation and post-compensation adjustment occurs in a manner that the bit error rate for each channel is approximately equalized. The greater the bit rate, the more accurate the pre-compensation and post-compensation should be.

The principles described herein may be applied whether upgrading an existing optical fiber link, or whether designing and setting up a new optical fiber link. If upgrading an existing optical fiber system, the optical fiber system tends not to be dispersion-managed, and thus each wavelength channel tends to have diverging dispersion maps as illustrated in FIG. 3. In that case, different pre-compensation amounts might well be applied to each channel as in the case of FIG. 6, where larger absolute amounts of pre-compensation are applied to channels on the longer and shorter extremes of the wavelength channels, and more moderate amounts of pre-compensation are applied to the more central wavelength channels.

If designing a new existing optical fiber link, it is more likely that the optical fiber link might be dispersion-managed, in which the dispersion maps for each wavelength channel do not diverge as illustrated in FIG. 6, but instead all of the dispersion maps for each wavelength channel converge into a single dispersion map as previously described. Conventionally, dispersion-managed optical fiber systems are designed to have a horizontal dispersion map. However, as will now be described, a counterintuitive benefit is achieved by designing dispersion-managed optical fiber systems that have trend slopes that are slightly positive or negative.

Figure 7A:
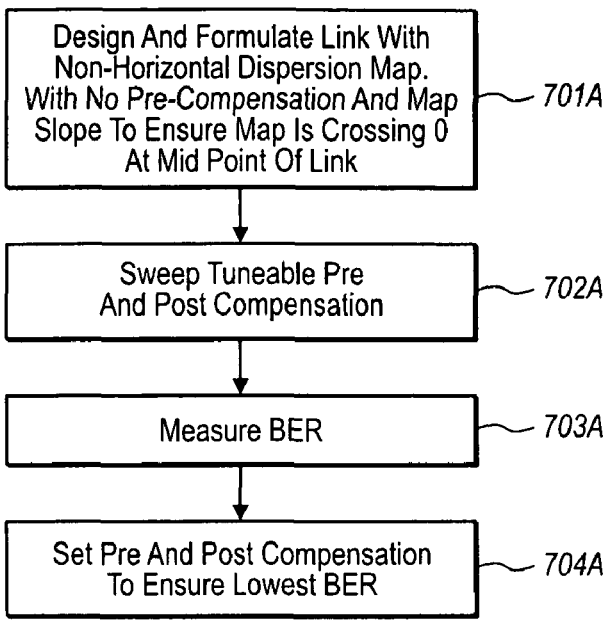
FIG. 7A illustrates a flowchart of a method for setting up a submarine or other long-haul optical system when using dispersion-managed optical fiber systems.

FIG. 7A illustrates a flowchart of a method 700A for setting up a new inter-terminal optical fiber link using dispersion-managed fiber. For instance, the inter-terminal optical fiber link might be for a submarine optical system. As just mentioned, the method 700A includes the designing and formulating of an optical fiber link in which the trend slope of the accumulated chromatic dispersion is intentionally non-horizontal (act 701A). For instance, the map trend slope might be designed to be at least one degree from horizontal. In any case, regardless of whether the map trend slope is more or less than this amount, or whether the map trend slope is positive or negative, the initial guess for pre-compensation may be not to apply any pre-compensation at all. (act 701A). In that case, the dispersion-managed fiber is formulated such that the map trend slope would cross zero dispersion at the appropriate mid-point (or at least in a central region) of the intended transmission distance (act 701A). Generally speaking, the longer the transmission distance, and the smaller the dispersion profile amplitude in each compensation cycle, the less the map trend slope would be. Conventional dispersion-managed fiber is designed such that the trend slope is horizontal. In act 701A, a non-horizontal map trend slope may be achieved by, for example, changing the balance of positive dispersion and negative dispersion optical fiber. Regardless of the level of pre-compensation, the post-compensation mechanism aims to return the accumulated dispersion to zero or close to zero at the receiver.

The tunable pre-compensation mechanism (and thus the tunable post-compensation mechanism) is then adjusted so as to minimize bit error rate. For instance, the pre-compensation could be swept across all feasible values, thereby controlling the post-compensation across all corresponding values (act 702A). As the pre-compensation and post-compensation is swept (act 702A), the bit error rate is measured (act 703A). The pre-compensation and post-compensation is then set to minimize the bit error rate (act 704A). This adjustment may be performed using a closed control loop that measures bit error rate at the receive terminal, and further adjusts the tunable pre-compensation mechanism until an acceptable bit error rate is achieved.

Figure 7B:
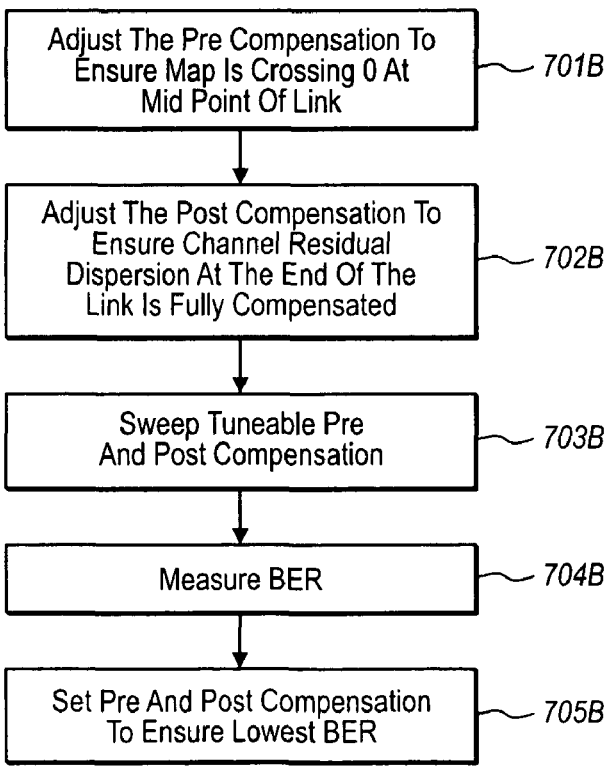
FIG. 7B illustrates a flowchart of a method for configuring a conventional submarine or other long-haul optical system that does not use dispersion-managed optical fiber systems.

FIG. 7B illustrates a flowchart of a method 700B for configuring an inter-terminal optical fiber link that uses non-dispersion-managed fiber. For each optical channel, the pre-compensation is adjusted such that the map trend line for the corresponding dispersion map crosses the zero accumulated dispersion point at a central region of the optical fiber link. For instance, for a 6600 kilometer optical fiber link, the pre-compensation for any given optical fiber channel is made sufficient such that the dispersion map average crosses the zero dispersion point at about 3300 kilometers.

In addition, the post-compensation is adjusted to ensure that the residual accumulated dispersion present in the received optical signal is eliminated or at least significantly reduced (act 702B). The tunable pre-compensation mechanism (and thus the tunable post-compensation mechanism) is then adjusted so as to minimize bit error rate. For instance, the pre-compensation could be swept across all feasible values, thereby controlling the post-compensation across all corresponding values (act 703B). As the pre-compensation and post-compensation is swept (act 703B), the bit error rate is measured (act 704B). The pre-compensation and post-compensation is then set to minimize the bit error rate (act 705B).

Figure 8:
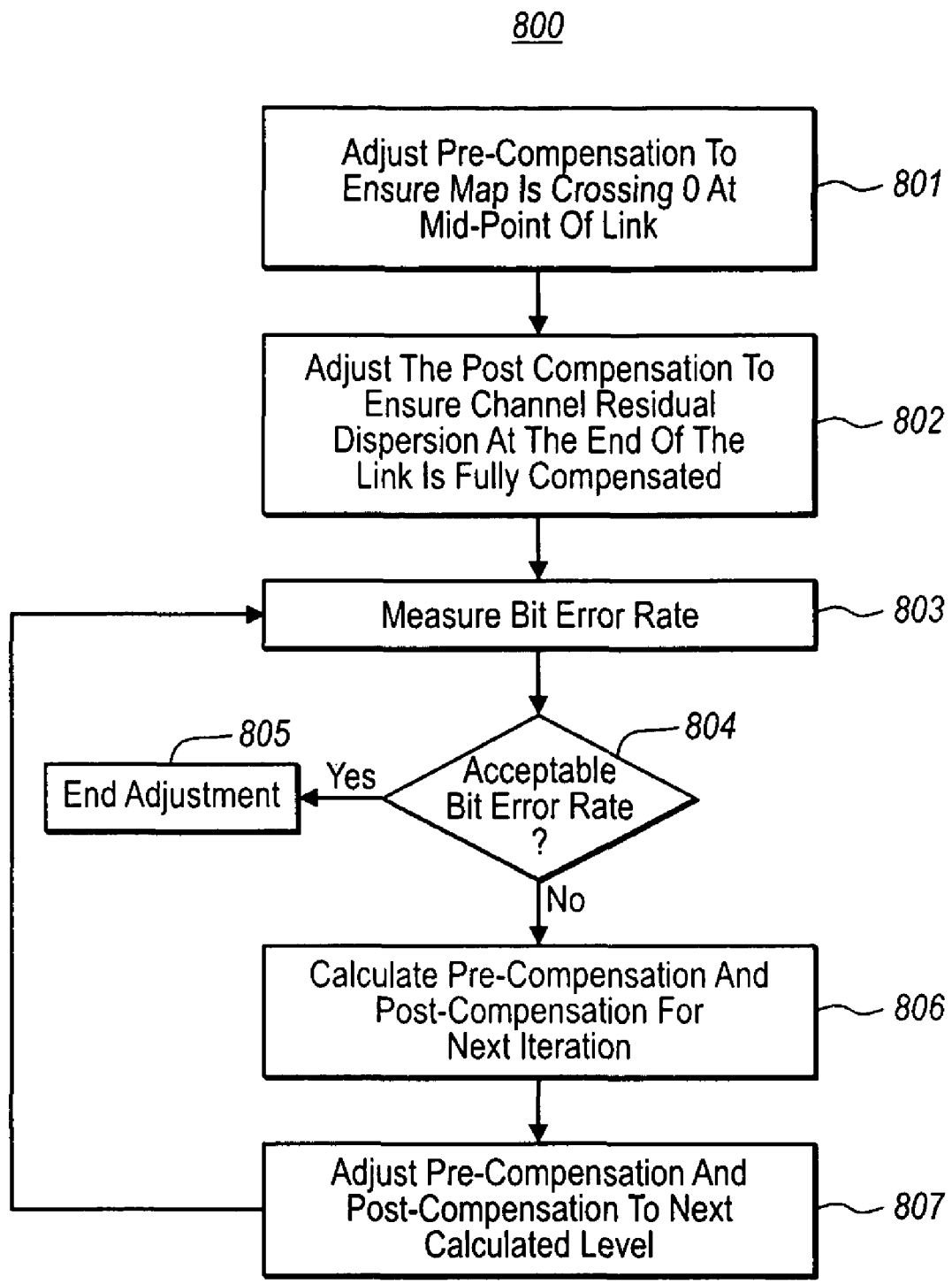
FIG. 8 illustrates a flowchart of a method for iteratively adjusting the tunable pre-compensation and post-compensation mechanism so as to reduce bit error rate.

FIG. 8 illustrates a flowchart of a method 800 for iteratively (or continuously) adjusting the tunable pre-compensation mechanism. If performed on a dispersion-managed system, the method 800 may be performed for all channels together. Otherwise, the method 800 may be performed independently for all channels.

The pre-compensation initially adjusted to an initial level in which the transmit optical signal reaches a minimum accumulated dispersion within a central distance of the length of the dispersion-managed optical fiber link (act 801). In addition, the post-compensation is adjusted so as to reduce or eliminate residual accumulated dispersion at the receive terminal (act 802). The corresponding bit error rate is then measured (act 803), and the transmit terminal is notified via the closed control loop. If the bit error rate is acceptable (Yes in decision block 804), the adjustment process may end (act 805). In a less sensitive environment, perhaps the initial level is sufficient to attain the designed bit error rate level, and thus there may be no further adjustment of the pre-compensation. In some cases, it is possible that the initial guess for pre-compensation may always be sufficient for the application. In those cases, the pre-compensation mechanism need not be adaptive at all.

In any case, if the bit error rate is not acceptable (No in decision block 804), the measured bit error rate is used to calculate a suitable next iteration for the pre-compensation amount (act 806). The pre-compensation is then adjusted to the next pre-compensation value (act 807). This might involve making a corresponding change to the post-compensation for that channel. The method then reverts to act 803 where the bit error rate is measured at the new pre-compensation amount.

Accordingly, the principles provided herein provide an effective mechanism to transmit wavelength division multiplexed optical signals at high bit rates, low bit error rates, and long distances. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for setting up an optical system that includes at least in one direction a transmit terminal, a receive terminal, and a dispersion-managed optical fiber link coupled therebetween to allow a transmit optical signal to be transmitted by the transmit terminal, through the dispersion-managed optical fiber link, and to the receive terminal, the method comprising:
    an act of formulating the dispersion-managed optical fiber link in which the map trend slope of the accumulated chromatic dispersion is non-horizontal and such that the map trend slope intersects zero dispersion at a central region of an intended transmission distance between the transmit terminal and the receive terminal, wherein the non-horizontal map trend slope is achieved by having a positive dispersion introduced by one or more positive dispersion optical fiber segments of the dispersion-managed optical fiber link be out of balance with a negative dispersion introduced by one or more negative dispersion optical fiber segments of the dispersion-managed optical fiber link;
    an act of adjusting a tunable pre-compensation mechanism at the transmit terminal so as to reduce bit error rate; and
    during the act of adjusting the tunable pre-compensation mechanism at the transmit terminal, an act of adjusting a tunable post-compensation mechanism at the receive terminal so as to reduce accumulated dispersion of optical signals received at the receive terminal,
    wherein the act of adjusting the tunable pre-compensation mechanism is performed using a closed control loop that measures bit error rate at the receive terminal, and further adjusts the tunable pre-compensation mechanism and the post-compensation mechanism until an acceptable bit error rate is achieved.

2. A method in accordance with claim 1, wherein the act of adjusting the pre-compensation comprises an act of at least initially setting the pre-compensation at zero.

3. The method in accordance with claim 1, wherein the central region is from 30 to 70 percent of the length of the dispersion-managed optical fiber link.

4. The method in accordance with claim 1, wherein the central region is from 40 to 60 percent of the length of the dispersion-managed optical fiber link.

5. The method in accordance with claim 1, wherein the central region is from 45 to 55 percent of the length of the dispersion-managed optical fiber link.

6. The method in accordance with claim 1, wherein the central region is from 48 to 52 percent of the length of the dispersion-managed optical fiber link.

7. The method in accordance with claim 1, wherein the central region surrounds the center point of the dispersion-managed optical fiber link by 1000 kilometers in either direction.

8. The method in accordance with claim 1, wherein the central region surrounds the center point of the dispersion-managed optical fiber link by 500 kilometers in either direction.

9. The method in accordance with claim 1, wherein the central region surrounds the center point of the dispersion-managed optical fiber link by 200 kilometers in either direction.

10. The method in accordance with claim 1, wherein the trend slope is positive.

11. The method in accordance with claim 1, wherein the trend slope is negative.

12. The method in accordance with claim 1, wherein each of the plurality of wavelength division multiplexed channels of the transmit optical signals have a bit rate of at least 20 Gbit/s and are modulated using at least 2 PSK data modulation.

13. A method for configuring an optical system that includes at least in one direction a transmit terminal, a receive terminal, and an optical fiber link coupled there between to allow a transmit optical signal to be transmitted by the transmit terminal, through the optical fiber link, and to the receive terminal, the method comprising:
    an act of adjusting a tunable pre-compensation mechanism at the transmit terminal such that at least a majority of a plurality of wavelength division multiplexed channels of the transmit optical signal at least initially reaches a minimum accumulated dispersion within a central distance of the length of the optical fiber link, wherein the act of adjusting is performed using a closed control loop that measures bit error rate at the receive terminal, and further adjusts the tunable pre-compensation mechanism until an acceptable bit error rate is achieved.

14. The method in accordance with claim 13, wherein the central region is from 30 to 70 percent of the length of the dispersion-managed optical fiber link.

15. The method in accordance with claim 13, wherein the central region is from 40 to 60 percent of the length of the dispersion-managed optical fiber link.

16. The method in accordance with claim 13, wherein the central region is from 45 to 55 percent of the length of the dispersion-managed optical fiber link.

17. The method in accordance with claim 13, wherein the central region is from 48 to 52 percent of the length of the dispersion-managed optical fiber link.

18. The method in accordance with claim 13, wherein the central region surrounds the center point of the dispersion-managed optical fiber link by 1000 kilometers in either direction.

19. The method in accordance with claim 13, wherein the central region surrounds the center point of the dispersion-managed optical fiber link by 500 kilometers in either direction.

20. The method in accordance with claim 13, wherein the central region surrounds the center point of the dispersion-managed optical fiber link by 200 kilometers in either direction.

* * * * *